US008098747B2

(12) United States Patent
Lee

(10) Patent No.: US 8,098,747 B2
(45) Date of Patent: Jan. 17, 2012

(54) OFDM SYSTEM, SYMBOL ESTIMATING APPARATUS AND INTER-CARRIER INTERFERENCE CANCELLATION METHOD FOR ESTIMATING SYMBOL VALUE USING OUTPUT OF FORWARD ERROR CORRECTION DECODER

(75) Inventor: Jeong-taek Lee, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 699 days.

(21) Appl. No.: 11/763,803

(22) Filed: Jun. 15, 2007

(65) Prior Publication Data

US 2008/0049852 A1 Feb. 28, 2008

(30) Foreign Application Priority Data

Aug. 25, 2006 (KR) .................. 10-2006-0081167

(51) Int. Cl.
*H04K 1/10* (2006.01)

(52) U.S. Cl. ........ 375/260; 375/262; 375/267; 375/275; 375/340; 375/346; 375/347; 375/349

(58) Field of Classification Search .......... 375/260, 375/262, 267, 275, 340, 341, 346, 347, 349; 370/203, 204, 206, 208, 209, 210; 455/59
See application file for complete search history.

(56) References Cited

U.S. PATENT DOCUMENTS

| 7,406,125 | B2* | 7/2008 | Morejon et al. ......... 375/240.29 |
| 7,412,005 | B2* | 8/2008 | Wang et al. .................... 375/260 |
| 7,415,085 | B2* | 8/2008 | Fujii et al. ..................... 375/346 |
| 7,577,087 | B2* | 8/2009 | Palin .............................. 370/210 |
| 2003/0128656 | A1* | 7/2003 | Scarpa .......................... 370/203 |
| 2004/0091057 | A1* | 5/2004 | Yoshida ........................ 375/260 |
| 2009/0052566 | A1* | 2/2009 | Maltsev et al. ............... 375/260 |

FOREIGN PATENT DOCUMENTS

| JP | 2004-208254 | 7/2004 |
| JP | 2004-289475 | 10/2004 |
| KR | 1020060001646 | 1/2006 |

* cited by examiner

*Primary Examiner* — Dhaval Patel
(74) *Attorney, Agent, or Firm* — F. Chau & Associates, LLC

(57) ABSTRACT

A OFDM system, a symbol estimation apparatus and an inter-carrier interference cancellation method for estimating a symbol value using the output of a forward error correction decoder. The OFDM system includes a symbol estimation unit, a time varying channel impulse response estimation unit and an interference cancellation unit. The symbol estimation unit performs forward error correction on a received OFDM signal according to a forward error correction code to estimate a symbol value of the received OFDM signal. The time varying channel impulse response estimation unit estimates a time varying channel impulse response in response to the received OFDM signal. The interference cancellation unit cancels inter-carrier interference between carriers of the received OFDM signal based on the estimated symbol value output from the symbol estimation unit and the estimated time varying channel impulse response output from the time varying channel impulse response estimation unit.

18 Claims, 4 Drawing Sheets

OFDM SYSTEM, SYMBOL ESTIMATING APPARATUS AND INTER-CARRIER INTERFERENCE CANCELLATION METHOD FOR ESTIMATING SYMBOL VALUE USING OUTPUT OF FORWARD ERROR CORRECTION DECODER

CROSS-REFERENCE TO RELATED PATENT APPLICATION

This application claims the benefit, under 35 USC §119, of Korean Patent Application No. 10-2006-0081167, filed on Aug. 25, 2006, in the Korean Intellectual Property Office, which is incorporated by reference herein in its entirety.

BACKGROUND OF THE INVENTION

1. Field of the Invention

The present invention relates to an OFDM (Orthogonal Frequency Division Multiplex) system, a symbol estimating apparatus and an inter-carrier interference cancellation method, and more particularly, to an OFDM (Orthogonal Frequency Division Multiplex) system, a symbol estimating apparatus and an inter-carrier interference cancellation method for estimating a symbol value using the output of a forward error correction decoder.

2. Description of the Related Art

An OFDM system has an advantage of reducing the complexity of equalizer because it uses a 1-tap equalizer. However in an environment having an abrupt channel variation such as a rapidly moving receiver such as a cellphone in a moving automobile, a channel impulse response varies even during the brief period while a single OFDM symbol is transmitted. Accordingly, inter-carrier interference occurs and inter-carrier orthogonality is not secured. In this case, the 1-tap equalizer cannot perform channel equalization.

To remove the inter-carrier interference a multi-tap equalizer can be used. However, a matrix having a size corresponding to the number of carriers must be inversely transformed in order to apply the multi-tap equalizer for all the carriers of an OFDM symbol. This greatly increases the complexity of the equalizer.

SUMMARY OF THE INVENTION

An aspect of the present invention provides an OFDM system for estimating a symbol value using the output of a forward error correction (FEC) decoder to remove inter-carrier interference.

Another aspect of the present invention provides a method for removing inter-carrier interference by estimating a symbol value using the output of a forward error correction (FEC) decoder.

Another aspect of the present invention also provides a symbol estimation apparatus for estimating a symbol value using the output of a forward error correction decoder.

According to an aspect of the present invention, there is provided an OFDM (Orthogonal Frequency Division Multiplex) system comprising a symbol estimation unit, a time varying channel impulse response estimation unit, and an interference cancellation unit.

The symbol estimation unit performs forward error correction on a received OFDM signal according to a forward error correction code to estimate a symbol value of the received OFDM signal. The time varying channel impulse response estimation unit estimates a time varying channel impulse response in response to the received OFDM signal. The inter-ference cancellation unit cancels inter-carrier interference between carriers of the received OFDM signal on the basis of the estimated symbol value output from the symbol estimation unit and the estimate time varying channel impulse response output from the time varying channel impulse response estimation unit.

The symbol estimation unit may comprise a forward error correction decoder, a forward error correction encoder, and a mapping unit. The forward error correction decoder performs forward error correction according to a forward error correction code. The forward error correction encoder receives and encodes the output of the forward error correction decoder. The mapping unit maps the output of the forward error correction encoder and outputs the estimated symbol value of the received OFDM signal.

The forward error correction decoder may be a Viterbi decoder. The Viterbi decoder may be a soft-decision Viterbi decoder performing soft decision.

The symbol estimation unit may further comprise a first inverse Fourier transformer. The first inverse Fourier transformer inversely Fourier-transforms the output of the mapping unit.

The time varying channel impulse response estimation unit may interpolate at least three channel impulse responses to estimate the time varying channel impulse response. The time varying channel impulse response estimation unit may perform cubic interpolation on four channel impulse responses to estimate the time varying channel impulse response.

The time varying channel impulse response estimation unit may comprise a channel estimator, a second inverse Fourier transformer, and an interpolator. The channel estimator estimates a channel from the received OFDM signal. The second inverse Fourier transformer inversely Fourier-transforms the output of the channel estimator and outputting a channel impulse response. The interpolator interpolates the channel impulse response to estimate the time varying channel impulse response.

The interference cancellation unit may comprise a convolution unit and an adder. The convolution unit convolves the estimated symbol value and the estimated time varying channel impulse response and outputs an inter-carrier interference component. The adder removes the inter-carrier interference component from the received OFDM signal.

According to another aspect of the present invention, there is provided an inter-carrier interference cancellation method comprising: performing forward error correction on a received OFDM signal according to a forward error correction code to estimate a symbol value of the received OFDM signal; estimating a time varying channel impulse response in response to the received OFDM signal; and canceling inter-carrier interference between carriers of the received OFDM signal on the basis of the estimated symbol value and the estimate time varying channel impulse response.

The performing of forward error correction on the received OFDM signal may comprise a forward error correction decoding substep, a forward error correction encoding substep, and a mapping substep. The forward error correction decoding substep performs forward error correction according to a forward error correction code. The forward error correction encoding substep receives and encodes the result of the forward error correction decoding substep. The mapping substep maps the result of the forward error correction encoding substep and outputs the estimated symbol value of the received OFDM signal. The forward error correction decoding substep may be a Viterbi decoding substep performing soft decision.

The performing of forward error correction on the received OFDM signal may further comprise a first inverse Fourier transform substep. The first inverse Fourier transform substep inversely Fourier-transforming the result of the mapping substep.

The estimating of the time varying channel impulse response may interpolate at least three channel impulse responses to estimate the time varying channel impulse response. The estimating of the time varying channel impulse response may perform cubic interpolation on four channel impulse responses to estimate the time varying channel impulse response.

The estimating of the time varying channel impulse response may comprise a channel estimation substep, a second inverse Fourier transform substep, and an interpolation substep. The channel estimation substep estimates a channel from the received OFDM signal. The second inverse Fourier transform substep inversely Fourier-transforms the result of the channel estimation substep and outputs a channel impulse response. The interpolation substep interpolates the channel impulse response to estimate the time varying channel impulse response.

According to another aspect of the present invention, there is provided a symbol estimation apparatus comprising a forward error correction decoder, a forward error correction encoder, and a mapping unit. The forward error correction decoder performs forward error correction according to a forward error correction code. The forward error correction encoder receives and encodes the output of the forward error correction decoder. The mapping unit maps the output of the forward error correction encoder and outputs an estimated symbol value.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

BRIEF DESCRIPTION OF THE DRAWINGS

The above and other features and advantages of the present invention will become more apparent to persons skilled in the art by describing in detail exemplary embodiments thereof with reference to the attached drawings in which.

DETAILED DESCRIPTION OF EXEMPLARY EMBODIMENTS OF THE INVENTION

Figure 1:
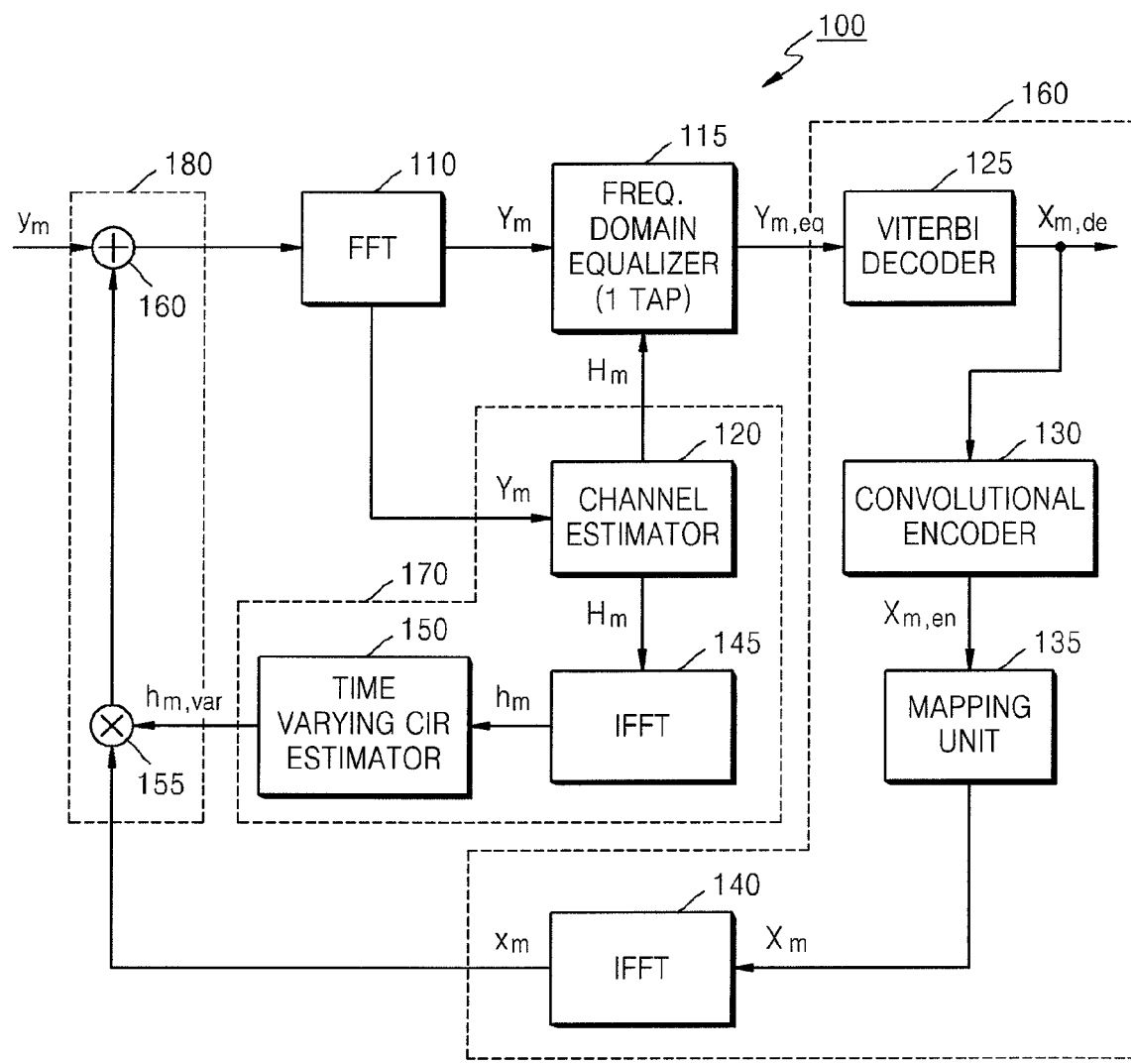
FIG. 1 is a block diagram of an OFDM system according to an embodiment of the present invention.

FIG. 1 is a block diagram of an OFDM system 100 according to an exemplary embodiment of the present invention. Referring to FIG. 1, the OFDM system 100 includes a symbol estimation unit 160, a time varying channel impulse response estimation unit 170, and an interference cancellation unit 180. The OFDM system 100 may further include a Fourier transformer 110. The Fourier transformer 110 Fourier-transforms the received OFDM signal $y_m$ and outputs it to the symbol estimation unit 160 (via the equalizer 115) and to the time varying channel impulse response estimation unit 170.

The symbol estimation unit 160 performs forward error correction (FEC) on a received OFDM signal $y_m$ according to a forward error correction code. Accordingly, the symbol estimation unit 160 estimates a received symbol's value to generate the estimated symbol value $x_m$. The time varying channel impulse response estimation unit 170 estimates a time varying channel impulse response $h_{m,var}$ in response to the received OFDM signal $y_m$. The interference cancellation unit 180 removes inter-carrier interference of the received OFDM signal $y_m$ based on the estimated symbol value $x_m$ and the estimated time varying channel impulse response $h_{m,var}$.

The symbol estimation unit 160 may include a forward error correction decoder 125, a forward error correction encoder 130, and a mapping unit 135. The forward error correction decoder 125 performs forward error correction according to a forward error correction code. The forward error correction encoder 130 receives the output $X_{m,de}$ of the forward error correction decoder 125 and encodes the output $X_{m,de}$ of the forward error correction decoder. The mapping unit 135 maps the output $X_{m,en}$ of the forward error correction encoder 130 and outputs the estimated symbol value $X_m$.

The forward error correction decoder 125 may be a Viterbi decoder. The Viterbi decoder may be a soft-decision Viterbi decoder performing soft decision. The symbol estimation unit 160 may further include a first inverse Fast Fourier transformer (IFFT) 140. The first inverse Fourier transformer 140 inversely Fourier-transforms the output $X_m$ of the mapping unit 135.

The time varying channel impulse response estimation unit 170 can interpolate at least three channel impulse responses to estimate the time varying channel impulse response $h_{m,var}$. The time varying channel impulse response estimation unit 170 can perform cubic interpolation on four channel impulse responses to estimate the time varying channel impulse response $h_{m,var}$.

The time varying channel impulse response estimation unit 170 may include a channel estimator 120, a second inverse Fast Fourier transformer (IFFT) 145 and an interpolator 150. The channel estimator 120 estimates a channel from the received OFDM signal $y_m$ and outputs an estimated channel value $H_m$. The second inverse Fast Fourier transformer 145 inversely Fourier-transforms the estimated channel value $H_m$ and outputs a channel impulse response $h_m$. The interpolator 150 interpolates the channel impulse response $h_m$ to generate the estimated time varying channel impulse response $h_{m,var}$.

The interference removal unit 180 may include a convolution unit 155 and an adder 160. The convolution unit 155 convolves the estimated symbol value $x_m$ and the estimated time varying channel impulse response $h_{m,var}$ and outputs an inter-carrier interference component. The adder 160 removes the inter-carrier interference from the received OFDM signal $y_m$.

The OFDM system 100 according to an embodiment of the present invention may further include an equalizer 115. The equalizer 115 compensates for a channel influence in the received OFDM signal $y_m$ and outputs the compensated OFDM signal to the symbol estimation unit 160. The equalizer 115 can be a 1-tap equalizer.

Figure 2:
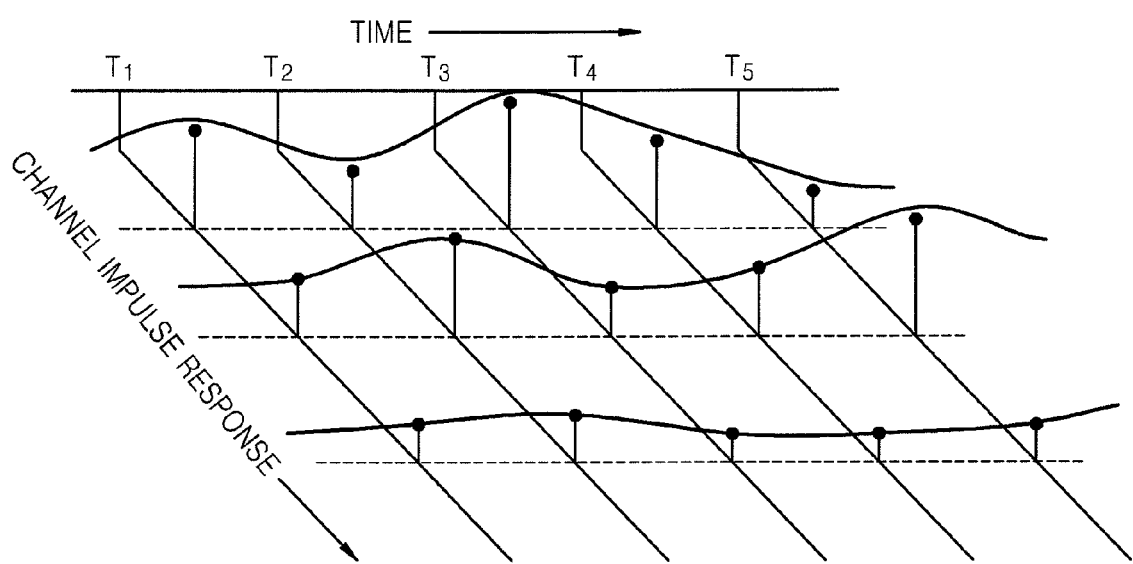
FIG. 2 is a graph that illustrates the operation of a time-varying channel impulse response estimation unit of FIG. 1 to interpolate a carrier to estimate a time varying channel impulse response.

FIG. 2 is a graph for illustrating the operation of the time varying channel impulse response estimation unit 170 shown in FIG. 1 to interpolate a carrier to estimate the time-varying channel impulse response. FIG. 2 illustrates channel impulse responses varying with time and OFDM symbol values varying with time.

The time varying channel impulse response estimation unit 170 can interpolate channel impulse responses of three symbols (for example, T1, T2 and T3) to generate the estimated time-varying channel impulse response $h_{m,var}$. Furthermore, the time varying channel impulse response estimation unit 170 can perform cubic interpolation on channel impulse responses of four symbols (for example, T1, T2, T3 and T4) to generate the estimated time varying channel impulse response $h_{m,var}$. Moreover, the time varying channel impulse response estimation unit 170 can interpolate channel impulse responses of more than five symbols (for example, T1 through T5, as shown in FIG. 2).

An inter-carrier interference cancellation method according to an embodiment of the present invention includes a symbol estimation step, a time varying channel impulse response estimation step, and an interference cancellation step. The symbol estimation step performs forward error correction on a received OFDM signal according to a forward error correction code to estimate a symbol value of the received signal. The time varying channel impulse response estimation step estimates a time varying channel impulse response in response to the received OFDM signal. The interference cancellation step removes inter-carrier interference between carriers of the received OFDM signal on the basis of the estimated symbol value and the estimated time varying channel impulse response.

The symbol estimation step includes a forward error correction decoding substep, a forward error correction encoding substep, and a mapping substep, The forward error correction decoding substep forward-error-corrects a received OFDM signal according to a forward error correction code. The forward error correction encoding substep receives the result of the forward error correction decoding substep and encodes the received result. The mapping substep maps the result of the forward error correction encoding substep and outputs an estimated symbol value of the received signal.

The forward error correction decoding operation may be a Viterbi decoding substep performing soft decision.

The symbol estimation operation may further include a first inverse Fourier transform substep. The first inverse Fourier transform substep inversely Fourier-transforms the result of the mapping substep.

The time varying channel impulse response estimation step can interpolate at least three channel impulse responses to estimate the time varying channel impulse response. The time varying channel impulse response estimation step can perform cubic interpolation on four channel impulse responses to estimate the time varying channel impulse response.

The time varying channel impulse response estimation step may include a channel estimation substep, a second inverse Fourier transform substep and an interpolation substep. The channel estimation substep estimates a channel from a received OFDM signal. The second inverse Fourier transform substep inversely Fourier-transforms the result of the channel estimation substep and outputs a channel impulse response. The interpolation substep interpolates the channel impulse response to estimate the time varying channel impulse response.

The interference cancellation step may include a convolution substep and an adding substep. The convolution substep convolves the estimated symbol value and the estimate channel impulse response and outputs an inter-carrier interference component. The adding substep cancels the inter-carrier interference component between carriers of the received OFDM signal. The inter-carrier interference cancellation method according to an embodiment of the present invention has the same technical spirit as that of the OFDM system 100 according to the present invention, illustrated in FIG. 1, and corresponds to the OFDM system 100. Thus, those having ordinary skill in the art will understand the inter-carrier interference cancellation method according to the present invention from the above explanations so that detailed explanation thereof is omitted.

Figure 3:
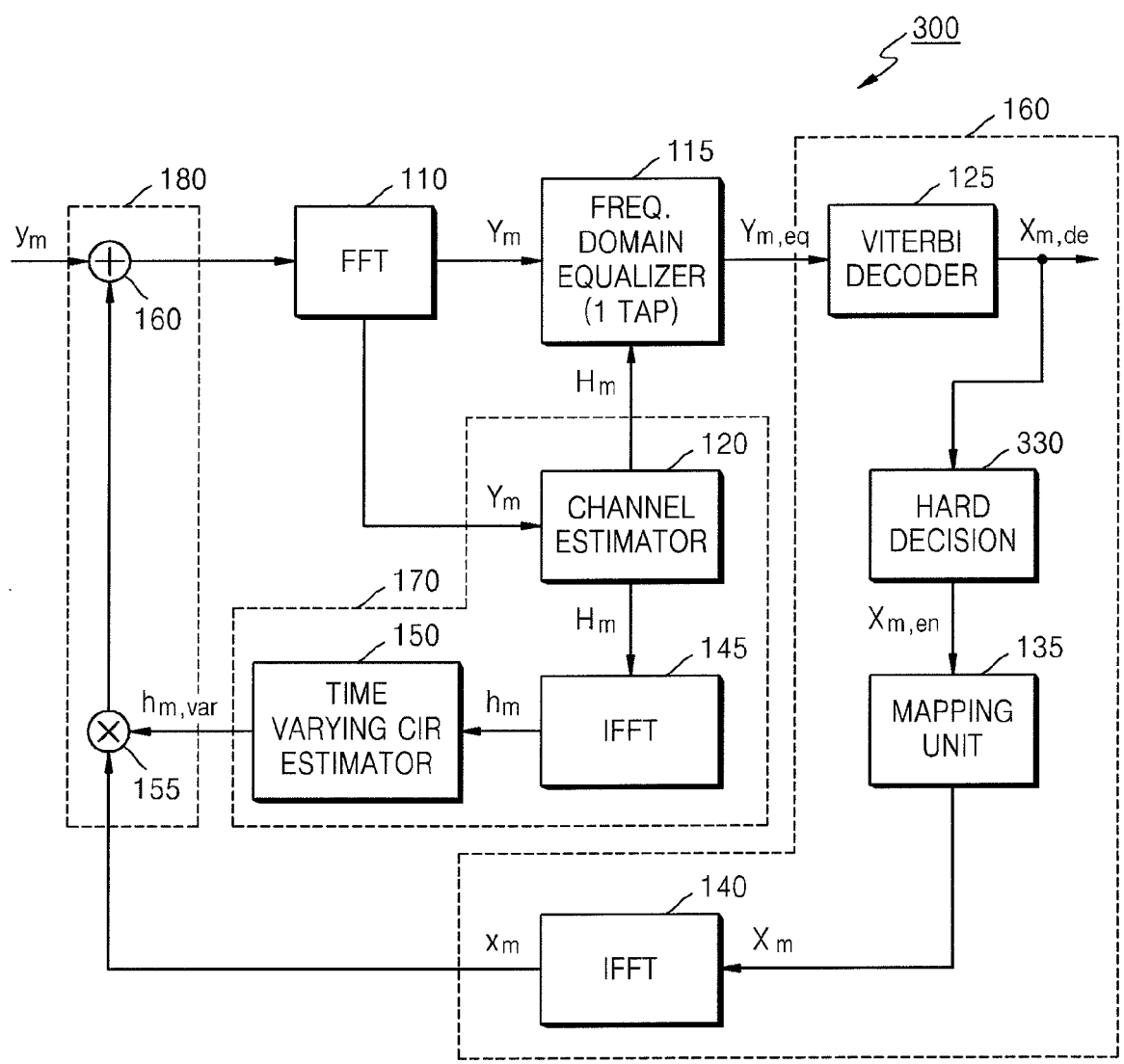
FIG. 3 is a block diagram of an OFDM system configured to estimate a symbol value using hard decision.

FIG. 3 is a block diagram of an OFDM system 300 that estimates a symbol value using hard decision, according to another exemplary embodiment of the present invention. Generally, the similar elements of the OFDM system 300 (a symbol estimation unit, a time varying channel impulse response estimation unit 170, and an interference cancellation unit, a fast Fourier transformer 110, and an equalizer 115) perform the same functions as the corresponding elements of the system of FIG. 1 for estimating the symbol of the received signal to remove inter-carrier interference. However, the OFDM system 300 of FIG. 3 includes a Hard Decision unit 330 instead of the encoder 130 of FIG. 1. The OFDM system 300 performs hard decision on the output of the equalizer 115 to estimate the symbol based on a received OFDM signal.

Figure 4:
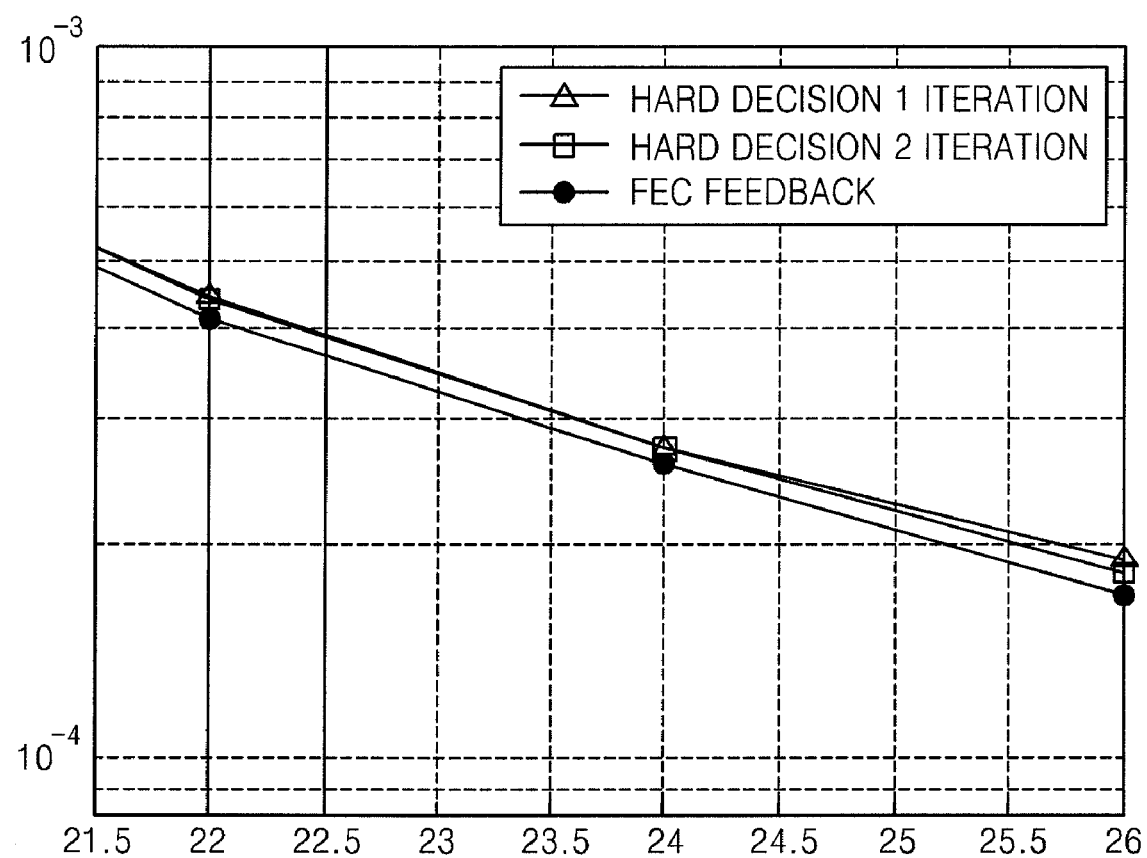
FIG. 4 is a graph comparing the performance of the OFDM system of FIG. 1 to the OFDM system of FIG. 3.

FIG. 4 is a graph comparing the performance of the OFDM system 100 of FIG. 1 to the OFDM system 300 of FIG. 3. In FIG. 4, 'FEC FEEDBACK' indicates the performance of the OFDM system 100 of FIG. 1. The labels, 'HARD DECISION 1 ITERATION' and 'HARD DECISION 2 ITERATION' indicates the performance of the OFDM system 300.

Referring to FIG. 4, the performance of the OFDM system 100 illustrated in FIG. 1 is improved by approximately 0.5 dB compared to that of the OFDM system 300 illustrated in FIG. 3. Specifically, in the case where the symbol value is estimated using the output of the forward error correction decoder to remove inter-carrier interference, the performance is improved by approximately 0.5 dB over the case where the symbol value is estimated twice using hard decision. The result illustrated in FIG. 4 is obtained by a simulation carried out under the condition of ITU channel modes vehicular A (120 Km/h), FFT=1024, guard interval 1/8, and 16QAM Viterbi code rate 1/2.

The symbol estimation apparatus according to the present exemplary embodiment of the invention has the same technical spirit as that of the symbol estimation unit 160 of the OFDM system 100 of FIG. 1, and corresponds to the symbol estimation unit 160. Thus, those having ordinary skill in the art will understand the symbol estimation apparatus from the above explanations so that detailed explanation thereof is omitted.

As described above, the OFDM system the symbol estimation apparatus and the inter-carrier interference cancellation method according to the present invention can effectively cancel inter-carrier interference to correctly estimate a symbol value.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An OFDM (Orthogonal Frequency Division Multiplex) system comprising:

a time-domain interference cancellation unit configured to cancel inter-carrier interference (ICI) between carriers of a received OFDM signal in a time domain based on an estimated symbol value output from a symbol estimation unit and an estimated time varying channel impulse response output from a time varying channel impulse response estimation unit;

a Fourier transformer configured to Fourier-transform the interference-cancelled received OFDM signal and to output the Fourier-transformed signal as an input of the symbol estimation unit and as an input of the time varying channel impulse response estimation unit; and a frequency-domain equalizer configured to compensate for a channel influence in the received OFDM signal and to output the equalized Fourier-transformed signal to the symbol estimation unit, wherein the Fourier transformer is configured to output the Fourier-transformed signal to the equalizer;

the symbol estimation unit including a first inverse Fourier transformer (IFFT) and configured to perform forward error correction on the equalized Fourier-transformed signal according to a forward error correction code and to estimate a symbol value of the received OFDM signal; and the time varying channel impulse response estimation unit including:
a channel estimator configured to provide an estimated channel value signal from the Fourier-transformed signal;
a second inverse Fourier transformer (IFFT) configured to provide a channel impulse response based on the channel value signal; and
an interpolator configured to interpolate the channel impulse response to estimate the time varying channel impulse response,
wherein a same estimated channel value signal from the Fourier-transformed signal is used both by the frequency-domain equalizer to compensate for the channel influence and by the second inverse Fourier transformer (IFFT) to provide the channel impulse response.

2. The OFDM system of claim 1, wherein the symbol estimation unit comprises:
a forward error correction decoder configured to perform forward error correction according to a forward error correction code;
a forward error correction encoder configured to receive and encode the output of the forward error correction decoder; and
a mapping unit configured to map the output of the forward error correction encoder and to output the estimated symbol value of the received OFDM signal.

3. The OFDM system of claim 2, wherein the forward error correction decoder is a Viterbi decoder.

4. The OFDM system of claim 3, wherein the Viterbi decoder is a soft-decision Viterbi decoder configured to perform soft decision.

5. The OFDM system of claim 2, wherein the first inverse Fourier transformer (IFFT) is configured to inversely Fourier-transform the output of the mapping unit.

6. The OFDM system of claim 1, wherein the time varying channel impulse response estimation unit is configured to interpolate at least three channel impulse responses to estimate the time varying channel impulse response.

7. The OFDM system of claim 6, wherein the time varying channel impulse response estimation unit is configured to perform cubic interpolation on four channel impulse responses to estimate the time varying channel impulse response.

8. The OFDM system of claim 1, wherein the interference cancellation unit comprises:

a convolution unit configured to convolve the estimated symbol value and the estimated time varying channel impulse response and to output an inter-carrier interference component; and
an adder configured to remove the inter-carrier interference component from the received OFDM signal.

9. The OFDM system of claim 1, wherein the frequency-domain equalizer is a 1-tap equalizer.

10. An inter-carrier interference cancellation method comprising:
generating an interference-compensated received OFDM signal by canceling inter-carrier interference (ICI) between carriers of a received OFDM signal using an estimated symbol value and an estimated time varying channel impulse response, wherein interference compensation is performed in the time-domain;
generating a Fourier-transformed signal by Fourier-transforming the interference-compensated received OFDM signal and outputting a Fourier-transformed signal;
an equalization step, compensating for a channel influence in the received OFDM signal using the Fourier-transformed signal and outputting an equalized Fourier-transformed signal to the symbol estimation step;
performing forward error correction on the equalized Fourier-transformed signal according to a forward error correction code to estimate a symbol value of a1 received OFDM signal;
estimating a time varying channel impulse response based on the Fourier-transformed signal;
wherein:
a channel value signal is estimated based upon the Fourier-transformed signal,
a channel impulse response is provided based on the channel value signal using an inverse Fourier-transformation,
the channel impulse response is interpolated to estimate the time varying channel impulse response, and,
wherein a same estimated channel value signal from the Fourier-transformed signal is used both for equalization to compensate for the channel influence and for providing the channel impulse response.

11. The inter-carrier interference cancellation method of claim 10, wherein the performing of forward error correction comprises:
a forward error correction decoding substep performing forward error correction according to a forward error correction code;
a forward error correction encoding substep receiving and encoding the result of the forward error correction decoding operation; and
a mapping substep mapping the result of the forward error correction encoding substep and outputting the estimated symbol value of the received OFDM signal.

12. The inter-carrier interference cancellation method of claim 11, wherein the forward error correction decoding substep is a Viterbi decoding substep performing soft decision.

13. The inter-carrier interference cancellation method of claim 11, wherein the performing of forward error correction further comprises a first inverse Fourier transform substep inversely Fourier-transforming the result of the mapping substep.

14. The inter-carrier interference cancellation method of claim 10, wherein the estimating of the time varying channel impulse response interpolates at least three channel impulse responses to estimate the time varying channel impulse response.

15. The inter-carrier interference cancellation method of claim 14, wherein the estimating of the time varying channel impulse response performs cubic interpolation on four channel impulse responses to estimate the time varying channel impulse response.

16. The inter-carrier interference cancellation method of claim 10, wherein the canceling of the inter-carrier interference comprises:
   a convolution substep convolving the estimated symbol value and the estimated time varying channel impulse response and outputting an inter-carrier interference component; and
   an adding substep removing the inter-carrier interference component from the received OFDM signal.

17. The inter-carrier interference cancellation method of claim 10, wherein the equalization operation is a 1-tap equalization operation.

18. An inter-symbol interference (ISI) compensation circuit of an OFDM (Orthogonal Frequency Division Multiplex) receiver comprising:
   a time-domain interference cancellation unit configured to cancel inter-carrier interference (ICI) between carriers of a received OFDM signal in a time-domain based on the estimated symbol value output from a symbol estimation unit and the estimated time varying channel impulse response output from a time varying channel impulse response estimation unit;
   a Fourier transformer configured to Fourier-transform the interference-cancelled received OFDM signal and to output the Fourier transformed signal as an input of the symbol estimation unit and as an input of the time varying channel impulse response estimation unit;
   the symbol estimation unit including a first inverse Fourier transformer (IFFT) and configured to perform forward error correction on the equalized Fourier-transformed signal according to a forward error correction code and to estimate a symbol value of the received OFDM signal; and
   the time varying channel impulse response estimation unit including:
      a channel estimator configured to provide a channel value signal from the Fourier-transformed signal;
      a second inverse Fourier transformer (IFFT) configured to provide a channel impulse response based on the channel value signal; and
      an interpolator configured to interpolate the channel impulse response to estimate the time varying channel impulse response; and
   a frequency-domain equalizer configured to receive the Fourier-transformed signal from the Fourier transformer, to compensate for a channel influence in the received OFDM signal and to output the equalized Fourier transformed signal to the symbol estimation unit,
   wherein a same estimated channel value signal from the Fourier-transformed signal is used both by the frequency-domain equalizer to compensate for the channel influence and by the second inverse Fourier transformer (IFFT) to provide the channel impulse response.

* * * * *